United States Patent
Walther

(10) Patent No.: US 9,436,675 B2
(45) Date of Patent: Sep. 6, 2016

(54) METHOD AND DEVICE FOR PHONETIZING DATA SETS CONTAINING TEXT

(71) Applicant: CONTINENTAL AUTOMOTIVE GMBH, Hannover (DE)

(72) Inventor: Jens Walther, Fronausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/378,896

(22) PCT Filed: Feb. 11, 2013

(86) PCT No.: PCT/EP2013/052650
§ 371 (c)(1),
(2) Date: Aug. 14, 2014

(87) PCT Pub. No.: WO2013/120794
PCT Pub. Date: Aug. 22, 2013

(65) Prior Publication Data
US 2015/0302001 A1    Oct. 22, 2015

(30) Foreign Application Priority Data
Feb. 16, 2012 (DE) .......... 10 2012 202 391

(51) Int. Cl.
*G10L 19/06* (2013.01)
*G10L 21/00* (2013.01)
(Continued)

(52) U.S. Cl.
CPC .......... *G06F 17/2785* (2013.01); *G10L 13/04* (2013.01); *G10L 13/08* (2013.01); *G10L 15/08* (2013.01); *G10L 15/18* (2013.01); *G10L 15/187* (2013.01); *G10L 15/22* (2013.01)

(58) Field of Classification Search
CPC ..... G10L 15/08; G10L 15/187; G10L 15/22; G10L 15/265; G10L 15/063; G10L 15/02; G10L 13/07; G10L 13/08; G10L 21/04; G10L 19/12; H05K 999/99; G06F 17/289; G06F 17/2737
USPC ....... 704/252, 209, 260, 254, 275, 211, 251, 704/236, 2, 258, 235, 243, 10, 220, 266, 704/231, 257
See application file for complete search history.

(56) References Cited

U.S. PATENT DOCUMENTS 538,893 A * 5/1895 Burk .................. A43B 3/16
36/53

(Continued)

FOREIGN PATENT DOCUMENTS

| CN | 101266789 | 9/2008 |
| CN | 101312038 | 11/2008 |

(Continued)

OTHER PUBLICATIONS

William I. Hallahan, "DECtalk Software: Text-to Speech Technology and Implementation", Compaq, Digital Technical Journal, Pages Apr. 11, 1996.

(Continued)

*Primary Examiner* — Pierre-Louis Desir
*Assistant Examiner* — Anne Thomas-Homescu
(74) *Attorney, Agent, or Firm* — Cozen O'Connor

(57) ABSTRACT

A method for phonetizing text-containing data records that include graphemes includes: phonetizing the data records by converting the graphemes in the data records into phonemes, and storing the phonemes as phonetized data records; and preprocessing to condition the graphemes for the phonetization by modifying the graphemes on a language-defined and/or user-defined basis. The preprocessing of the graphemes and the conversion of the graphemes into phonemes are performed in parallel on different computation units or different portions of the computation units.

5 Claims, 1 Drawing Sheet

(51) Int. Cl.
*G10L 15/00* (2013.01)
*G10L 19/00* (2013.01)
*G10L 15/26* (2006.01)
*G10L 15/04* (2013.01)
*G10L 13/00* (2006.01)
*G10L 13/08* (2013.01)
*G10L 25/00* (2013.01)
*G10L 15/06* (2013.01)
*G10L 15/18* (2013.01)
*G10L 13/06* (2013.01)
*G06F 17/27* (2006.01)
*G10L 15/08* (2006.01)
*G10L 15/187* (2013.01)
*G10L 15/22* (2006.01)
*G10L 13/04* (2013.01)
*G06F 17/21* (2006.01)
*G06F 17/28* (2006.01)

(56) References Cited

U.S. PATENT DOCUMENTS

| | | | | |
|---|---|---|---|---|
| 4,979,216 | A * | 12/1990 | Malsheen | G10L 13/08 704/260 |
| 5,384,893 | A * | 1/1995 | Hutchins | G10L 13/10 704/258 |
| 5,634,084 | A * | 5/1997 | Malsheen | G06F 17/273 704/260 |
| 5,873,061 | A * | 2/1999 | Hab-Umbach | G10L 15/142 704/251 |
| 5,940,796 | A * | 8/1999 | Matsumoto | G10L 13/02 704/258 |
| 6,076,060 | A * | 6/2000 | Lin | G10L 13/08 704/258 |
| 6,094,633 | A * | 7/2000 | Gaved | G10L 13/08 704/260 |
| 6,108,627 | A * | 8/2000 | Sabourin | G10L 15/187 704/10 |
| 6,959,279 | B1 * | 10/2005 | Jackson | G10L 13/047 365/45 |
| 8,069,045 | B2 * | 11/2011 | Emam | G06F 17/273 704/255 |
| 2002/0049591 | A1 * | 4/2002 | Hain | G10L 13/08 704/243 |
| 2006/0031069 | A1 * | 2/2006 | Huang | G10L 13/08 704/243 |
| 2006/0074924 | A1 * | 4/2006 | Tilei | G10L 15/063 |
| 2006/0265220 | A1 * | 11/2006 | Massimino | G10L 13/08 704/235 |
| 2007/0005206 | A1 * | 1/2007 | Zhang | G06F 3/16 701/36 |
| 2008/0114598 | A1 * | 5/2008 | Prieto | G10L 15/10 704/254 |
| 2008/0228485 | A1 * | 9/2008 | Owen | G06F 17/30681 704/254 |
| 2009/0150153 | A1 * | 6/2009 | Li | G10L 13/08 704/254 |
| 2010/0125459 | A1 * | 5/2010 | Itoh | G10L 13/08 704/260 |
| 2010/0179803 | A1 * | 7/2010 | Sawaf | G06F 17/28 704/2 |
| 2010/0299133 | A1 * | 11/2010 | Kopparapu | G06F 17/289 704/2 |
| 2012/0010888 | A1 * | 1/2012 | Stephens, Jr. | G10L 13/08 704/260 |
| 2012/0116766 | A1 * | 5/2012 | Wasserblat | G10L 15/08 704/254 |
| 2014/0074468 | A1 * | 3/2014 | Sorin | G10L 25/48 704/236 |
| 2014/0222415 | A1 * | 8/2014 | Legat | G10L 13/08 704/8 |

FOREIGN PATENT DOCUMENTS

CN 101449319 6/2009
DE 692 32 112 T2 3/2002

OTHER PUBLICATIONS

Sergio Paulo et al.: "DIXI a Generic Text-to Speech System for European Portuguese", Computational Processing of the Portuguese Language; Springer Berlin Heidelberg, Berlin, Heidelberg, pp. 91-100.

* cited by examiner

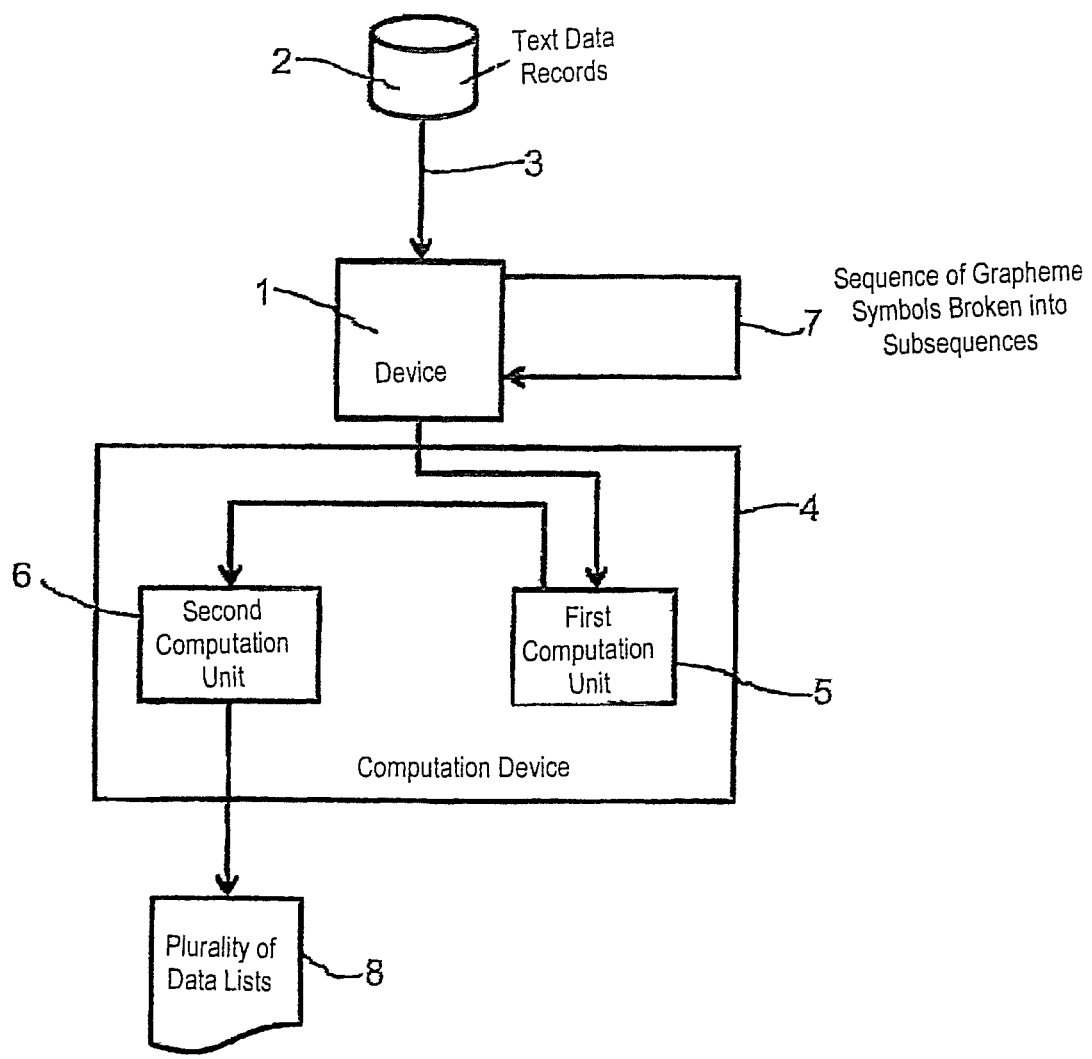

METHOD AND DEVICE FOR PHONETIZING DATA SETS CONTAINING TEXT

CROSS-REFERENCE TO RELATED APPLICATIONS

This is a U.S. national stage of application No. PCT/EP2013/052650, filed on 11 Feb. 2013, which claims priority to the German Application. No. DE 102012202391.7 filed 16 Feb. 2012, the content of both incorporated herein by reference.

BACKGROUND OF THE INVENTION

1. Field of the Invention

The invention relates to a method and a device for phonetizing text-containing data records, particularly with different contents, such as music tracks, music artists, music albums or telephone book entries, contact names or the like, that are used in voice-controlled user interfaces for controlling particular processes in which the user forwards voice commands containing these contents to the user interface. Without limiting the invention to this preferred instance of application, a preferred field of application for the invention is in the area of motor vehicle controllers, particularly multimedia control units in motor vehicles, which are used for information, entertainment and/or communication in motor vehicles. Control units of this kind can contain music reproduction and telephone functions, in particular.

In the case of the method proposed according to the invention, the data records, which are present as graphemes, as a sequence of individual grapheme symbols, particularly as a letter sequence or standardized letter sequence, are converted into phonemes, i.e. a sequence of individual phoneme symbols, and stored as phonetized data records, for example in a phonetized data list. According to the standard definition, a phoneme is a representation of sound that forms the smallest meaning-distinguishing unit in a language, and has a distinctive function. In the present text, the term "phoneme" is understood particularly as a sequence of a plurality of individual phoneme symbols. A corresponding situation applies to the term grapheme, which is understood particularly as a sequence of individual grapheme symbols in the present text. In a similar manner to a phoneme, a grapheme (grapheme symbol) is the smallest meaning-distinguishing unit in the graphical representation of a text, and is frequently defined by the letters of an alphabet.

In the proposed method, the graphemes are conditioned for the actual phonetization in preprocessing, particularly by virtue of the graphemes being modified on a language-defined and/or user-defined basis before the conversion into phonemes is performed. The phonetized data list, for example in the form of the phonetized data records, can then be used in a manner known per se for the voice recognition in a voice-controlled user interface, for example.

The preprocessing has the background that the graphemes (and also the phonemes) are language-related, and depend on the respective language used. Frequently, however, the actual data records contain entries in different languages that need to be identified and adjusted for phonetization. Accordingly, the preprocessing can be implemented by recognition of foreign-language texts but also by replacement of abbreviations, omission of prefixes (such as "Herr", "Frau", "Dr.", the English article "the" or the like), expansion of acronyms and/or provision of pronunciation variants, which can be selected by the user.

Such preprocessing allows the usually voice-related restrictions of grapheme-to-phoneme conversion, in which only a particular prescribed number of digits and character strings that are to be spelt is supported, to be at least partially lifted by replacing those characters of the graphemes that are not supported by the language-dependent acoustic model used for the phonetization.

2. Related Art

In existing systems, however, the preprocessing has the problem that these methods are upstream of the actual grapheme-to-phoneme conversions, and the time that is needed for the preprocessing is added to the total latency for the grapheme-to-phoneme conversion.

Since the preprocessing may also be very computation-intensive depending on the complexity involved, either long latencies can be expected or the performance of the preprocessing needs to be restricted, for example by ignoring unsupported characters in the grapheme representation during the phonetization. On account of the scarcity of resources for the preprocessing, the known implementations of preprocessing can also be adjusted only conditionally to specific application requirements and, in particular, firmly programmed, particularly in respect of the number of variants and the available replacements and modifications.

SUMMARY OF THE INVENTION

It is therefore an object of the present invention to propose phonetization in which the time requirement for the preprocessing and the subsequent conversion of the graphemes into phonemes is reduced.

The invention achieves this object by a method, a device and a computer readable medium.

The proposed method has particular provision for the preprocessing of the graphemes and the conversion of the graphemes into phonemes to be performed in parallel on different computation units or portions of computation units, particularly different processors or processor portions. The different computation units can be implemented in various computation devices or in one computation device as dual or multi computation unit, particularly a dual or multi processor.

The parallel performance of the preprocessing of the graphemes and the conversion of the graphemes into phonemes can take place, in particular, such that in a first step graphemes provided for phonetization are preprocessed in a first computation unit, transmitted to a second computation unit and phonetized in the second computation unit, and converted into phonemes. During the phonetization of the graphemes in the second computation unit, graphemes provided for phonetization can then subsequently be processed in the first computation unit.

As already mentioned, the data records are usually present as graphemes, that is to say as sequences of individual grapheme symbols (particularly letters) so that on the basis of the capacity of the respective computation units a respective subsequence can be processed in each computation unit, for example in the style of an FIFO (first-in-first-out) buffer memory. The invention may possibly provide for a buffer memory between the first and second computation units in order to coordinate the timing of the computation processes of both computation units to one another and to be able to compensate in the short term for fluctuations in the computation power of the two computation units by buffer-storing the preprocessed graphemes.

A particularly advantageous use of the method proposed according to the invention is obtained in the case of dynamic voice recognition, in which the graphemes are first produced during the application from constantly changing text-containing data records, in contrast to use with a static database, in which the phonetization of the graphemes takes place for a start and the voice control then accesses the permanently stored phonemes.

According to a particularly preferred embodiment of the proposed method, the data records that are present as graphemes, i.e., as a sequence of individual grapheme symbols, can be broken down into grapheme subpackets, which can also be referred to as packets from grapheme subsequences, wherein a respective grapheme subpacket is preprocessed in a first computation unit and then phonetized in another second computation unit, and converted into phonemes, and wherein both computation units are set up to process different grapheme subpackets in parallel, particularly at the same time. The packet-by-packet splitting of the data to be processed allows particularly effective utilization of the available processor resources, so that temporally optimized performance of the phonetization with preprocessing and conversion becomes possible.

In this case, it is particularly advantageous, according to the invention, if the magnitude of a grapheme subpacket is prescribed, for example coordinated with the available computation power of the computation unit (i.e., on a platform-dependent basis). By way of example, a grapheme subpacket having a maximum length of 50 entries (or grapheme symbols) can be prescribed. It has been found that grapheme subpackets whose magnitude is coordinated with the platform (computation unit) can be preprocessed and converted particularly effectively, since in this case an optimum ratio is obtained for the volume of data to be processed and the messaging overhead. The messaging overhead arises because the data packets (grapheme subpackets) need to be interchanged between the various computation units or portions of computation units and the interchanges need to be coordinated to one another. Since both computation units need to buffer-store the data, it is also necessary for the respectively processed volume of data in a grapheme subpacket to be limited in order to allow effective and fast processing in any computation unit.

In this connection, it may also be particularly advantageous, according to the invention, for the magnitude of a packet to be determined by application of defined rules, particularly upstream or at the input of the preprocessing, in order to take account of the content-related context of individual grapheme symbols for the preprocessing and conversion. By way of example, these rules may contain the recognition of particular grapheme symbols that represent spaces or separating characters and/or an assessment of content, possibly in combination with a maximum and possibly also a minimum prescribed length of the subsequences, i.e., a length limitation or a length interval for the subsequences. The maximum prescribed length can take account of the computation power of the computation unit, in particular. The minimum prescribed length secures context-sensitive preprocessing and/or conversion, which can also assess and take account of the content of related graphemes.

In accordance with an aspect of the invention, a grapheme subpacket is prescribed, by a constant dependent on the first computation unit, for the volume of data in the grapheme subpackets to the messaging overhead that arises for communication between the first and second computation units.

In a particular embodiment of the proposed method, the preprocessing may, according to the invention, comprise a grammar-based parser that comprises particularly rules for the text modification and/or pronunciation variants, with different languages possibly being able to be taken into account. With particular preference, this grammar-based parser can be parameterized by prescribing rule-containing files, for example. The result of this is that the rules for the pattern matching and/or the linking of rules can, according to the invention, be easily edited, extended and replaced. For this, it is possible to resort to existing software modules, for example the GNU parser generators Flex and Bison, the application of which, particularly for dynamic databases, is possible only by virtue of the inventively proposed parallel processing of the preprocessing and conversion of the individual grapheme subsequences.

A further, inventive aspect of the proposed preprocessing is that it may comprise conversion of characters (for example in another language) that are not supported by the acoustic model of the grapheme-to-phoneme conversion (for example on account of a lack of language support) into grapheme symbols that are supported by the acoustic model, particularly into Latin basic characters or letters. This makes it possible to achieve flexible language support for databases having different contents that is also able, with particular preference, to be parameterized and/or adjusted in accordance with the aforementioned aspect, so that the preprocessing can be automatically adjusted, for example in the course of a firmware update, when provided data contents and hence the text-containing data records that are provided for the phonetization change.

The invention also relates to a device for phonetizing text-containing data records, for example in a, or for use in a, voice-controlled user interface, such as a multimedia control unit of a motor vehicle, particularly with a music controller, a car telephone device and/or a hands-free device, wherein a multimedia control unit has a data memory, for example a database, having the text-containing data records, which can possibly also be presented in a graphical user interface. The device is equipped with a data interface for inputting or reading in the text-containing data records, for example in the form of list entries, and has a computation device that is set up to convert the data records that are present as graphemes into phonemes and for the preceding preprocessing. According to the invention, the computation device has at least a first computation unit and a second computation unit, wherein the first and second computation units are set up to carry out the previously described method or portions thereof.

Accordingly, the invention also relates to a non-transitory computer readable medium storing a computer program suited to setting up a computation device of a device for phonetizing text-containing data records having two computation units, particularly as described previously, to carry out the previously described method or portions thereof.

BRIEF DESCRIPTION OF THE DRAWING

Further advantages, features and opportunities for application of the present invention also emerge from the description below of an exemplary embodiment and of the drawing. In this context, all the features described and/or shown in the figure form the subject matter of the present invention on their own or in any combination, including independently of their synopsis in the claims or the back-references therein.

The single FIG. 1 schematically shows an embodiment of the proposed device with the process of the method for phonetizing text-containing data records 2.

DETAILED DESCRIPTION OF THE PRESENTLY PREFERRED EMBODIMENTS

FIG. 1 shows a particularly preferred embodiment of a device 1 for phonetizing text-containing data records 2 that are held in a data memory or a database. The device 1 for phonetization may be integrated in a voice-controlled user interface, such as a multimedia control unit of a motor vehicle, and has a data interface 3 for inputting or reading in the text-containing data records 2. In addition, the device 1 contains a computation device 4 that is set up to convert the text-containing data records 2 that are present as graphemes and to preprocess the graphemes before the conversion into phonemes. This aspect of the computation device 4 is shown in FIG. 1 beside the device 1 for the sake of clarity, even though this computation device 4 is part of the device 1 or the user interface containing it.

This computation device 4 has a first computation unit 5 and a second computation unit 6, which, according to the invention, are suited to the parallel, mutually independent handling of data.

It is pointed out that the computation device 4 shown in FIG. 1 represents only the functions of the solution according to the invention that are to be described in even more detail below, and does not reproduce all of the processes and methods taking place on the computation device 4 or in computation units 5, 6 of the computation device 4.

The first computation unit 5 is configured to preprocess the graphemes and the second computation unit 6 is configured to convert the graphemes into phonemes, wherein the second computation unit 6 may preferably also have a voice recognition unit that is used by the voice-controlled user interface and accesses stored phonetized data records in the form of a phonetized data list, for example.

In this case, the method for phonetization proposed according to the invention takes place as described below:

When the text-containing data records 2 have been read into the device 1 for phonetization via the data interface 3, the graphemes, i.e., the sequence of individual grapheme symbols, are first of all broken down into grapheme subsequences of a prescribed length of, by way of example, 50 grapheme symbols or units. This is shown by the arrow 7, which is shown outside the computation device 4 in FIG. 1, even though the process of breakdown 7 also takes place in a possibly also additional computation unit of the computation device 4 and can be regarded as the first process step of preprocessing, for example.

Next, the grapheme subsequence is supplied to the first computation unit 5, which undertakes the preprocessing of the graphemes. In this case, the graphemes of each grapheme subsequence can be modified on a language-defined and/or user-defined basis, for example by replacement of abbreviations, recognition of foreign-language texts, omission of prefixes, expansion of acronyms and/or provision of language variants, which can be selected by the user.

The preprocessing implemented in the first computation unit 5 preferably comprises a grammar-based parser that comprises rules for the text modification and/or pronunciation variants, with possibly different languages being able to be taken into account. Furthermore, in the preprocessing implemented in the first computation unit 5, characters that are not supported by the acoustic model of the grapheme-to-phoneme conversion are converted into grapheme symbols that are supported by the acoustic model.

Following the preprocessing in the first computation unit 5, the (preprocessed) grapheme subsequence is supplied to the second computation unit 6, in which the actual grapheme-to-phoneme conversion takes place. This method is known generally and therefore does not need to be described in more detail at this juncture.

The result of the grapheme-to-phoneme conversion in the second computation unit 6 is that a phonetized data list 8 is produced and stored in the computation device 4 or a memory device of the device 1 for phonetization, so that a voice-controlled user interface can access this phonetized data list 8. The phonetized data list 8 is thus the phonetized data records.

The parallel processing of the preprocessing and the conversion in various independent computation units therefore adds only the waiting time for a first packet to the total latency for the phonetization of the text-containing data records, even if complex preprocessing is performed, which may comprise not only replacement of acronyms and the like but also language-dependent conversion of the characters in other languages that are not supported by the acoustic model of the phonetization into Latin basic characters. The parallel processing also allows comprehensive preprocessing to be performed and to be set in parameterizable fashion, so that the preprocessing rules can easily be directed into the system. Furthermore, these rules are well documented and can easily be changed in a comprehensible manner.

In addition, the invention involves efficient utilization of the processor resources for the phonetization, so that despite complex preprocessing the waiting times for the provision of the phonetized data list that is used for voice control increase only imperceptibly.

Another specific exemplary embodiment is described below, in which the method according to the invention is used in a vehicle entertainment appliance. The vehicle entertainment appliance has an interface for Bluetooth appliances, USB data storage media, iPod appliances or the like. The pieces of music contained therein are read by the central unit—called the head unit—of the vehicle entertainment appliance, with meta attributes of the pieces of music being stored in a database. This database can be searched using a graphical interface and single or multiple tracks can be played back. Besides the haptic selection of pieces of music, there is also voice-based operation of the vehicle entertainment appliance, with the pieces of music (albums, artists) being intended to be selected using their names.

Often, the meta attributes of the pieces of music are not suited to voice operation, which means that the user of the system is unable, or is only unnaturally able, to actually input his selection. A known approach to solving the problem involves comparison of the characteristics of the audio signal in a database that is played on the system, which database makes the meta attributes available to the voice recognition unit such that the user can easily select the tracks. The drawback of such a solution is that the database does not know the latest tracks, and therefore needs to be constantly updated. In addition, license costs become due and a memory requirement that is significant for embedded systems arises that would increase the fixed costs of such a product.

Instead, inventive preprocessing is applied that has the following method steps, in particular:

1. After the vehicle entertainment appliance has recognized a plug-in USB appliance or the like, an appliance-internal database is filled by indexing the pieces of music and their meta attributes.
2. The meta attributes are read from the database of the vehicle entertainment appliance into the voice-controlled user interface of the vehicle entertainment appliance in a manner sorted to categories.

3. The computation unit 4—set up in suitable fashion, for example—of the voice-controlled user interface as a device for phonetization reads the data on a packet-by-packet basis or breaks down the data into individual packets of a predefined magnitude, i.e., into grapheme subsequences or grapheme subpackets. A grapheme subpacket is provided for the preprocessor (the first computation unit 5).

4. The first computation unit 5 (preprocessor) essentially comprises a parser module that searches the data for particular patterns. Some of these patterns are language-dependent and are therefore interchangeable depending on the selected language. As an input, the first computation unit 5, i.e., the preprocessor, receives the grapheme from the database (primary grapheme) and also the current category descriptor.

5. The first computation unit 5 then creates an alternative text, for example, during the preprocessing and corrects the primary grapheme. By way of example, the frequently found suffix "feat. <Artist>" is thus expanded to "featuring <Artist>" for the primary grapheme. Alternatively, the primary grapheme "feat. <Artist>" is removed. Often, the attribute for track contains the index on the album and also the artist and album name. The primary grapheme then has the unnecessary portions eliminated. An alternative is not produced for this instance.

6. The preprocessed grapheme subpacket is forwarded to the voice recognition unit, which preferably resides on another, second computation unit 6.

7. In parallel with the complex phonetization (g2p) in the second computation unit 6, the second subpacket, or more generally a further grapheme subpacket, is processed on the preprocessor, i.e., in the first computation unit 5.

8. In parallel with the preprocessor (first computation unit 5) and the voice recognition unit with the grapheme-to-phoneme conversion (second computation unit 6), the voice-controlled user interface 1 requests the next packets from the database, so that a chain of packet processing operations is applied in the voice-controlled user interface 1. Of the parallel work steps comprising database query, preprocessing and phonetization, the last is the slowest. The parallelism of the preprocessor and the voice recognition unit means that no additional latency arises that goes beyond the preprocessing of the first subpacket.

The result obtained in the exemplary embodiment is improved operation for the user without any significant worsening of the latency or any increase in memory consumption arising.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for phonetizing text-containing data records (2) that include graphemes, and which are stored in a first storage, by a voice-controlled user interface at a vehicle having a computation device (4) having (a) a first computation unit (5), and (b) a second computation unit (6), the first and second computation units being configured to operate in parallel with one another, the second computation unit (6) having a voice recognition unit, and wherein the data records comprise music information, the method comprising:

the voice-controlled user interface generating phonetized data lists (8) by converting graphemes in the data records (2) stored in the first storage into phonemes, and storing, in a second storage, the phonemes as the phonetized data lists (8), the generating comprising:
breaking down the data records (2) present as graphemes into grapheme subpackets, wherein a length of a grapheme subpacket is determined by an optimum ratio dependent on the first computation unit (5), for a volume of data in the grapheme subpacket to a messaging overhead that arises from the communication between the first and second computation units (5, 6), wherein the message overhead represents the computational power of the first and second computation units based on the grapheme subpackets that are interchanged between the first and the second computation units;
preprocessing, by the first computation unit (5), the graphemes to condition the graphemes for the phonetization by modifying the grapheme subpackets on a language-defined and/or user-defined basis,
converting, by the second computation unit (6), the preprocessed grapheme subpackets into phonemes, wherein the preprocessing of the grapheme subpackets and the conversion of the grapheme subpackets into phonemes are performed in parallel on the first and second computation units (5, 6);
receiving user speech for identifying a selection of music;
performing, by the voice recognition unit, voice recognition on the received speech based on the converting of the preprocessed grapheme subpackets into phonemes, wherein the voice recognition unit is located at the second computation unit; and
playing back, at the vehicle, a music track based on the recognized speech and the converted grapheme subpackets.

2. The method as claimed in claim 1, wherein the preprocessing comprises grammar-based parsing.

3. The method as claimed in claim 1, wherein the preprocessing uses an acoustic model for grapheme-to-phoneme conversion, the method further comprising converting characters not supported by the acoustic model into grapheme symbols supported by the acoustic model.

4. A device for phonetizing text-containing data records (2) that include graphemes by carrying out the method of claim 1, the device comprising:
a data interface (3) configured to input the text-containing data records (2); and
the computation device (4) configured to convert the graphemes in the data records into phonemes and to preprocess the graphemes,
wherein the computation device (4) has at least the first computation unit (5) and the second computation unit (6), the first and second computation units (5, 6).

5. A non-transitory computer readable medium storing program code that, when executed, controls a computation device (4) of a device (1) for phonetizing text-containing data records (2) having at least first and second computation units (5, 6) to carry out the method as claimed in claim 1.

* * * * *